INVENTOR
PETER A. ARGENTIERI — HARRY
DANIN HIRSCH & THOMAS L. DAY
ATTORNEY

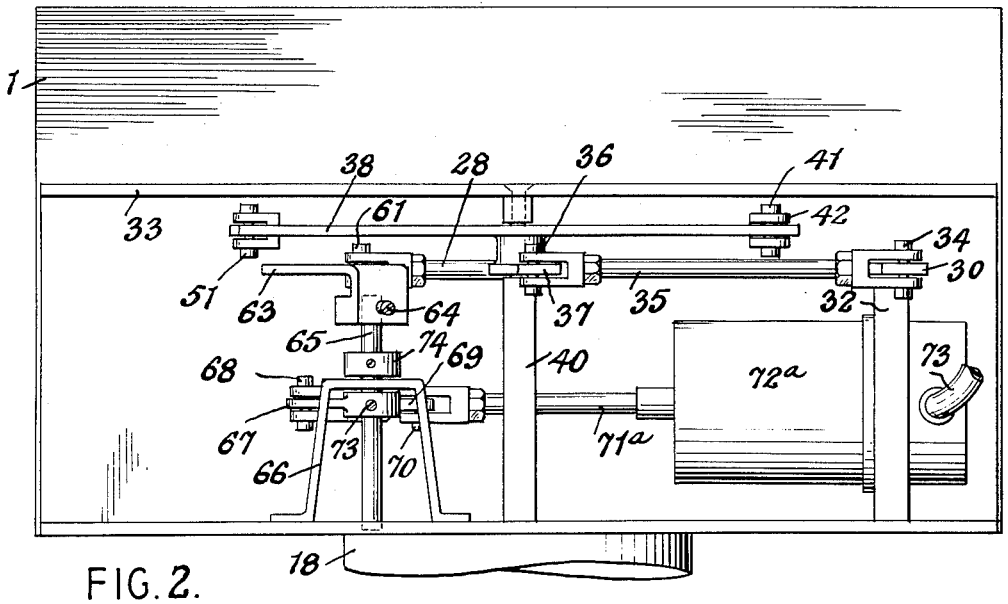

United States Patent Office 2,749,831
Patented June 12, 1956

2,749,831

AIR OUTLETS AND MEANS FOR CONTROLLING THE FLOW AND TEMPERATURE OF THE AIR THEREFROM

Peter A. Argentieri, Harry Daninhirsch, and Thomas L. Day, Danbury, Conn., assignors to Connor Engineering Corporation, Danbury, Conn., a corporation of New York Application November 29, 1954, Serial No. 471,698

12 Claims. (Cl. 98—38)

This invention relates to improvements in air outlet devices or diffusers for air-conditioning systems, and a primary object of the present construction is to provide an accurate means for controlling the flow and temperature of air from the outlet.

It is another object of the invention to provide a control means for air outlets by which the volume of air flowing from the outlet can be regulated, and by which a mixture of heated or cool air into a mixing chamber and therefrom through an outlet can be regulated and thermostatically controlled.

More particularly, the invention contemplates the provision of a mixing chamber or housing into which ducts leading from sources of heated and cool air enter; which ducts are each provided with means by which the amount of air passing through them and entering the mixing chamber can be controlled. The invention further contemplates the provision of damper means operative in each of the ducts to thermostatically control the amount of air entering into the mixing chamber from each of said ducts.

It is another object of the invention to provide means by which the movements of dampers within perforated adjustable cylinders located in the ducts can be controlled according to the adjustments of said cylinders relatively to the ducts.

It is still another object of the invention to provide a smoothly-operating control device by which a predetermined air flow of required temperature will be caused to emanate from a diffuser outlet according to room temperature requirements.

With these and other objects to be hereinafter set forth in view, I have devised the arrangement of parts to be described and more particularly pointed out in the claims appended hereto.

In the accompanying drawings, forming a part hereof, in which an illustrative embodiment of the invention is disclosed, Fig. 1 is a front elevational view of a structure embodying the present invention, with a part of the housing or mixing chamber broken away;

Fig. 2 is a view of the structure of Fig. 1, looking at the same from the left of Fig. 1;

Figure 3:
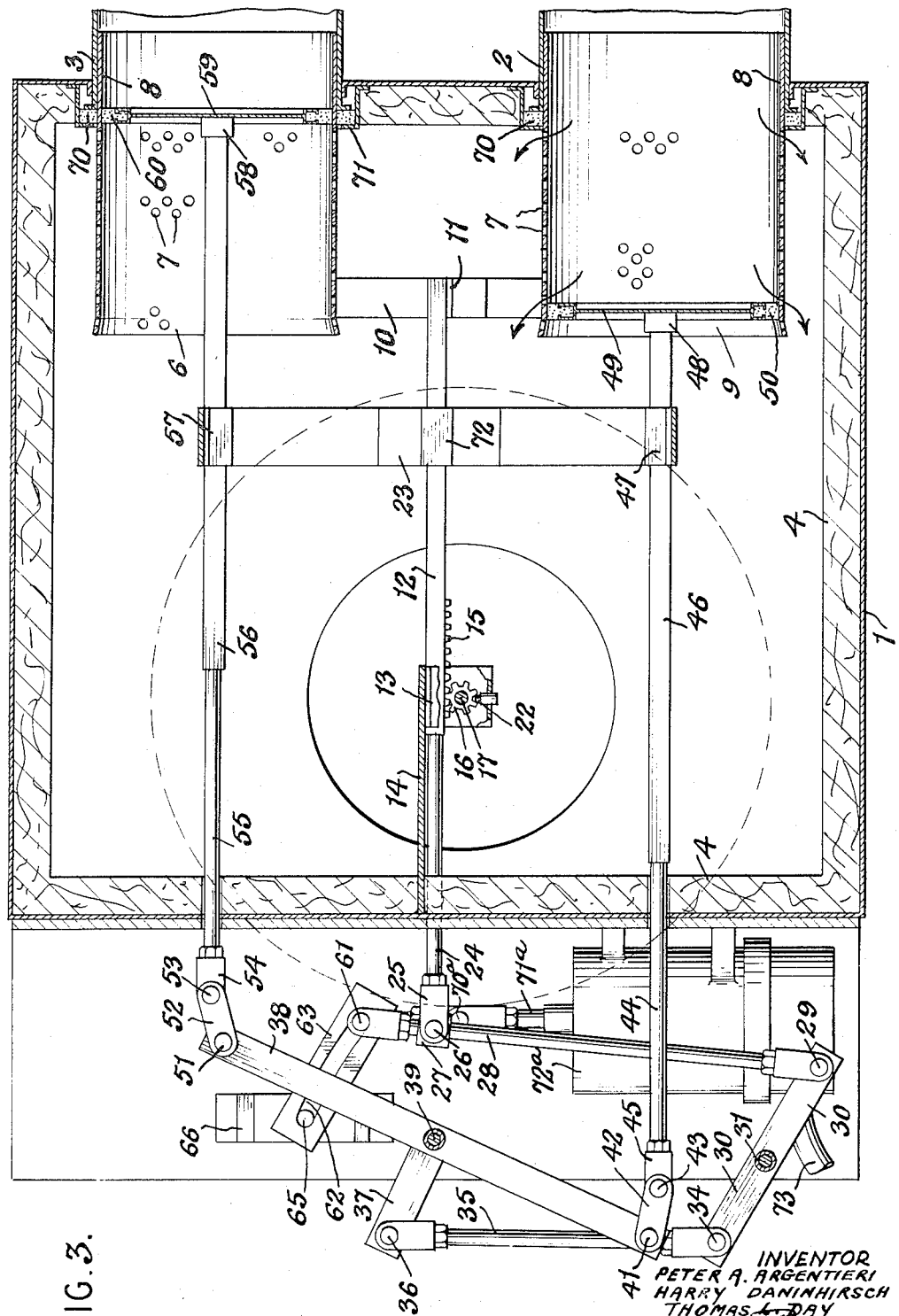
Fig. 3 is a horizontal sectional view of the structure of Figs. 1 and 2.

Referring to the drawings, 1 indicates generally a housing or air-mixing chamber, into which a pair of ducts, indicated respectively at 2 and 3, enter for the conveyance of heated and cool air respectively into the chamber 1 for mixture therein and for flow out through the outlet shown at 18. The housing 1 may be composed of sheet metal or other suitable material and is preferably lined with an insulating lining of sound-absorbent material indicated at 4. Mounted for axial slidable movement for a limited extent within the end portion of the duct 3 is a perforated or foraminous cylinder 6, which has a substantial area perforated, as shown at 7, and has an imperforate area indicated at 8. A packing 70 is interposed between the exterior of the cylinder 6 and an annulus 71 secured to the wall of the housing. A similar cylinder 9 is slidably operative within the duct 2, the latter cylinder being surrounded by the packing 70 and being also provided with the perforated area 7 and imperforate area 8. The two cylinders 6 and 9 are connected together by cross members 10, so that when one of the sleeves is axially moved toward or away from the duct outlet in which it is located, the other sleeve will be moved in company with it, the two sleeves being thus simultaneously adjustable and similarly within their respective duct outlets.

Extending vertically between the cross members 10 is an upright 11 to which is fixed one end of a channel bar 12 that is slidably guided through a housing 13 supported at the end of a bracket 14 located within the housing or mixing chamber 1 and fixedly secured to one of the walls thereof. Mounted in the channel of the bar 12 is a rack 15, in mesh with a pinion 16, secured at the upper end of a vertical rod 17 which extends down through the outlet passage 18 of the diffuser 19. The rod 17 terminates in a knob 20 (Fig. 1) located below the diffuser plate 21 and accessible for manual operation. By manual rotation of the knob 20 the rod 17 will be turned to thus rotate pinion 16 and the same by engagement with the rack 15 will cause shifting movement of the bar 12 in the required longitudinal direction to move the cylinders 6 and 9 to a greater or lesser extent into or out of the ducts 2 and 3 and thus regulate the extent of projection of the cylinders into the housing 1.

A spring-pressed detent 22 (Fig. 4) engages the teeth of the pinion 16 in a manner to prevent inadvertent rotation of the rod 17. It will be obvious that as the bar 12 is longitudinally moved by manual rotation of the rod 17, it will move the cylinders 6 and 9 accordingly, said bar being slidably guided through a guide 72 in the frame 23 mounted in the housing 1. At one end the bar 12 is provided with a cylindrical extension or rod portion 24 slidable through one of the walls of the housing 1 and terminating in a clevis 25, pivoted at 26 on a slide block 27, which block 27 surrounds a rod 28, said rod 28 being slidable through block 27 in a manner to be described.

A clevissed end of rod 28 is pivoted at 29, to one end of a lever 30, which is centrally pivoted at 31, on post 32 mounted in the channel frame 33 located at and secured to one end of the housing 1. The second end of the lever 30 is pivotally connected at 34 to a clevissed end of a link 35, having its opposite end pivotally secured at 36 to the end of an arm 37 rigidly projecting from a lever 38 which is centrally pivoted at 39 on the vertical post 40. One end of the lever 38 is pivotally connected at 41 to short twin links 42 having an end pivoted at 43 and 45 of a rod 44. The rod 44 is longitudinally slidable through one of the walls of the housing or mixing chamber 1 and is attached to a non-round or channel-shaped bar 46 slidably extending through a guide 47 provided on the frame 23. The bar 46, forming extension of rod 44, has its end attached at 48 to an imperforate disk or damper 49 fitting slidably within the cylinder 9 and adjustable axially of the same. The damper or disk 49 is provided with a periphery packing 50 producing a relatively air-tight fit between it and the inside surface of the cylinder 9, but allowing for axial sliding movement of the damper.

The second end of the lever 38 is pivoted at 51 to one end of twin short links 52, similar to those shown at 42, and said links 52 have their opposite ends pivoted at 53 to the end 54 of a rod 55 which slidably extends through the wall of the housing 1 and is joined to a non-round or channel bar 56, slidable through a guide 57 on frame 23. The member 56 has its end attached at 58 to a disk or damper 59, similar to that shown at 49, and which damper has the peripheral packing 60. Damper 59 is adjustable through the cylinder 8 similarly to the damper 49.

One end of the rod 28 is provided with a pivot pin 61 movable within a curved slot 62 to the limits of said slot. The slot 62 is formed in an arm 63 which is fixed by means of the set screw 64, on a vertical shaft 65 (Fig. 2) mounted rotatively in a bracket 66 secured on the lower flange of the frame member 33. Also secured on the shaft 65 by screw 73 is an arm 67, having an end pivotally attached at 68 to clevis 69 pivotally attached at 70a to the end of a piston rod 71a extending from a piston within a pneumatic cylinder 72a mounted in frame 33. A collar 74 is secured upon shaft 65 above bracket 66. Air under pressure is supplied to the interior of the cylinder through conduit 73 in a manner to move rod 71a when required, as will be hereinafter described.

From the foregoing, the operation of the apparatus will be readily understood. For the purpose of illustration it may be assumed that a supply of warm air will be delivered through the duct 3 and a supply of cool air through the duct 2. The amount of air entering into the mixing chamber or housing 1 is controlled by the size of the perforated area of the cylinders 6 and 9 that is located within the mixing chamber and is located between the disks 49 and 59 in the respective cylinders 6 and 9 and the ends of the ducts. For example, in Fig. 4, the supply of cool air seeking to flow into the mixing chamber 1 through duct 2 is completely cut off because damper 49 is at the end of its stroke to the right in said figure, and is located beyond the perforated area of the cylinder so that no perforated portion of the cylinder 9 is then located between the damper 49 and the end of the duct 2. On the other hand, a certain amount of warm air is being admitted into the mixing chamber 1 from duct 3 and through some of the perforations in the cylinder 6, because a portion of the perforated area of this cylinder is at this time located within housing 1 between the damper 59 and the end of the duct 3.

Figure 4:
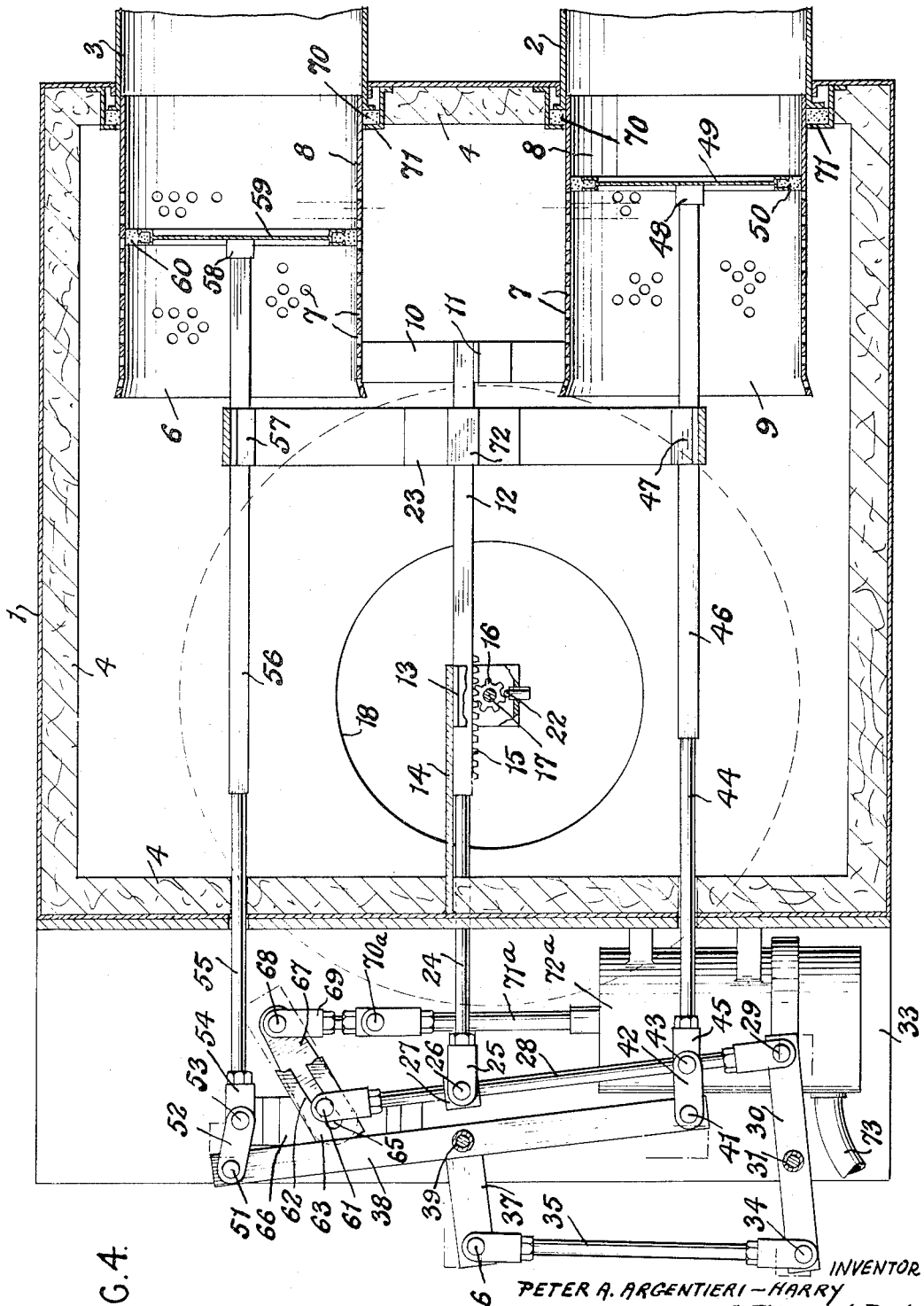
Fig. 4 is a similar view, showing the movable parts in a different position of operation.

The movement of the dampers 49 and 59 is controlled by a thermostatic control, not shown, but of known construction, and which will at the proper time operate a valve and cause the flow of air or possibly hydraulic fluid under pressure into cylinder 72a and cause the piston therein to urge rod 71a outwardly or toward the top of Fig. 4, thus rocking shaft 65 and causing the slotted arm 62 thereon to be swung in a manner to move rod 28 longitudinally and cause it, through its connection to lever 30, link 35 and arm 37, to pivot lever 38 and thus move rods 44 and 55 in opposite directions, with resultant opposite sliding movements of the dampers 49 and 59 within their respective cylinders 2 and 3. While the air or hydraulic pressure is exerted against the piston in cylinder 72a the dampers 49 and 59 will be held in their adjusted positions. When the room temperature reaches the required level, the thermostatic switch will become effective to cause means to relieve pressure in cylinder 72a and spring return means will retract rod 71a and thus return dampers 49 and 59 to their original positions.

The extent to which these dampers will be oppositely moved when the piston in cylinder 72a is actuated is dependent upon the position which the pivot 61 occupies in slot 62. For example, in Fig. 4, pivot 61 is shown as being very close to the left end of the slot 62 so that as a result, if piston rod 71a was moved for its usual constant stroke, the movement of dampers would be relatively slight or substantially as shown in dot-and-dash lines in the cylinders 6 and 9. On the other hand, when the pivot 61 is at the other end of the slot 62, as shown in Fig. 3, a relatively long movement of the dampers will be had because of the relationship of the pivot 61 to the pivotal point 65 of the slotted arm 63. Thus, while the stroke of the piston rod 71a will be uniform, the movement of the dampers 49 and 59 will vary according to the position of pivot 61 in slot 62. The position of this pivot is varied by means of the rack and pinion arrangement indicated at 15 and 16, since a longitudinal adjustment of rod 24 will move rod 28 on its pivot 29 to locate the pivot 61 at the required point in the slot 62 to secure the desired movements of the dampers when the piston in cylinder 72a is moved under air pressure controlled thermostatically. Thus, by manual adjustment of the extent of projection of the cylinders 6 and 8 into the mixing chamber or housing 1, coupled with a thermostatically-controlled adjustment of the dampers 49 and 59, the required amount and temperature of the air admitted into a room through diffuser outlet 19 can be easily regulated and controlled.

Having described an embodiment of the invention, it is obvious that the same is not to be restricted thereto, but is broad enough to cover all structures coming within the scope of the annexed claims.

What we claim is:

1. An air outlet device for air ducts comprising, a housing, a pair of ducts leading into said housing, an outlet from said housing, a perforated cylinder in each duct and adjustable relatively thereto to project partially out of the duct and extend into the housing to a predetermined extent, means for coupling the cylinders together, means for simultaneously adjusting the cylinders with respect to the ducts, a damper of disk formation slidably adjustable in each cylinder, means for simultaneously adjusting the two dampers in opposite directions to a predetermined extent, and means movable for a uniform distance, for moving the disks for varying distances within the cylinders.

2. An air outlet device comprising, a housing, a pair of air ducts leading into the housing, a perforated cylinder in each duct and adjustable to project for predetermined distances out of the duct and extend into the housing, means coupling the cylinders together whereby adjusting movement of one cylinder will cause a similar adjustment of the other, a damper slidably mounted in each cylinder and movable in the cylinder to vary the air flow into the housing, means for simultaneously moving the dampers in opposite directions, said means including an air cylinder having a piston rod moved for a uniform distance, and means interposed between said piston rod and the dampers for varying the movement of the dampers according to the setting of the cylinders with respect to the ducts in which the same are adjustable.

3. An air outlet device for air ducts comprising, a housing, a pair of separate ducts leading into said housing, an outlet from said housing, a perforated cylinder in each duct and adjustably slidable therein to project out of the duct and into the housing to a predetermined extent, means for coupling the cylinders together, means for manually, simultaneously axially adjusting the cylinders with respect to the ducts, a damper of disk formation slidably adjustable in each cylinder, means for simultaneously adjusting the two dampers in opposite directions to a predetermined extent, and means movable for a uniform distance, for moving the disks for varying distances within the cylinders according to the extent of projection of the cylinders out of the ducts.

4. An air outlet device comprising, a housing, a pair of air ducts leading into the housing, a perforated cylinder in each duct and adjustable to project for predetermined distances out of the duct and into the housing, means coupling the cylinders together whereby an adjusting movement of one cylinder will cause a similar adjustment of the other, a damper slidably mounted in each cylinder and movable in the cylinder to vary the air flow into the housing, means for simultaneously moving the dampers in opposite directions, said means including an air cylinder having a piston rod moved for a uniform distance, means interposed between said piston rod and the dampers for varying the movement of the dampers according to the setting of the cylinders with respect to the ducts in which the same are adjustable, and manual means for simultaneously moving the cylinders axially of the respective ducts.

5. An air outlet device comprising, a housing, a pair of air ducts leading into the same, an outlet leading from the housing, a perforated cylinder located in each duct and projecting into the housing, said cylinders being each slidably adjustable in its duct, means coupling said cylinders together so that the same are simultaneously adjustable, an adjusting element for moving the cylinders simultaneously axially of the ducts, a disk-shaped damper fitted in each cylinder and axially adjustable therein to vary the flow of air through the perforations of each cylinder and into the housing, rods extending from the dampers, linkage connecting the rods and operative to simultaneously move the disks in different directions, a piston rod coupled to said linkage and operative to move the damper rods for various distances according to the setting of the cylinders, the piston rod being always movable for a predetermined distance.

6. An air outlet device comprising, a housing, a plurality of air ducts leading into the same, a perforated cylinder slidably adjustable in each duct and movable out of the same and into the housing to a regulatable extent, a disk in each cylinder, means for moving the disks in different directions and means for controlling the distance of movement of the disks according to the extent to which the cylinders are projected out of the ducts and into the housing.

7. An air outlet device as provided for in claim 6, wherein the cylinders are simultaneously adjustable and to the same extent, means for simultaneously adjusting said cylinders, said means including an element operative to control the extent of movement of the disks according to the adjustment of the cylinders relative to the ducts.

8. In an air outlet device, a housing, a duct leading into the same, a perforated cylinder axially adjustable relative to the duct and caused to project into the housing, means for adjusting the cylinder, a slidable disk-shaped damper within the cylinder, means for automatically sliding said damper, and means controlled by the cylinder-adjusting means for determining the extent of adjusting movement of the disk according to the extent of protrusion of the cylinder out of the duct and into the housing.

9. An air outlet of the character described comprising, a housing, a pair of spaced-apart ducts communicating with the interior of the housing, a perforated cylinder located in each duct and axially adjustable therein to project out of the duct and into the housing to a greater or lesser extent, a damper in the form of a disk slidably arranged in each of the cylinders, linkage extending between the disks to cause the disks to be moved in different directions, the cylinders being connected together whereby the movement of one of the other cylinders will cause movement in the same direction of the other cylinder, means by which the extent of projection of the cylinders out of the respective ducts and into the housing can be regulated, said means including an element by which the movement of the linkage for the disks will be controlled to thereby regulate the extent of said movement of the disks according to the extent of projection of the cylinders out of the ducts and into the housing.

10. An air outlet of the character described comprising, a housing, a pair of spaced ducts communicating with the interior of the housing, a cylinder provided with a perforated area located in each duct and axially adjustable therein to project out of the duct and into the housing to a greater or lesser extent, a disk-shaped damper in each cylinder and slidably adjustable therein to thereby vary the extent of the perforated area in each cylinder through which air can flow from the duct and into the housing, linkage coupling the disks together in a manner to cause them to be moved in opposite directions, means for varying the movement of the disks, and means for manually moving the cylinders relative to the ducts to thereby control the extent of projection of the cylinders into the housing, the last-mentioned means being effective to control the extent of adjusting movement in opposite directions of the disks.

11. An air outlet of the character described comprising, a housing, a pair of ducts leading into the same, means for controlling the flow of air from the ducts and into the housing comprising a perforated cylinder slidable within the end of each duct and extensible to predetermined degrees into the housing, a damper slidably adjustable within each cylinder, manually-controlled means for determining the extent of projection of each cylinder into the housing, and thermostatically-controlled means for adjusting the positions of the disks within the cylinders, the extent of movement of the thermostatically-controlled means being determined by the adjusted positions of the cylinders.

12. An air duct outlet of the character described comprising, a housing, a pair of separate ducts having ends entering the housing, an air outlet for the housing, a perforated cylinder located in each duct and slidable out of the same into the housing to any desired extent, means connecting the cylinders and by which the same are simultaneously and similarly adjusted, said means including a manually-operated element effective to locate the cylinders at any one of a number of desired positions, a disk-shaped damper in each cylinder and slidable relatively to the same to thereby vary the extent of the perforated area in each cylinder through which air will flow from the duct to reach the interior of the housing, linkage connecting the disks and effective to move the same in opposite directions within their respective cylinders, said linkage including a piston rod moved for a constant distance, and means operative on the linkage for regulating the extent of movement of the disks according to the position of the cylinder relative to the ducts from which they protrude, said last-mentioned means being coupled to and controlled by the cylinder-adjusting means.

References Cited in the file of this patent

UNITED STATES PATENTS 2,620,983     Lyman                 Dec. 9, 1952